(12) United States Patent
Liao

(10) Patent No.: US 10,496,352 B2
(45) Date of Patent: Dec. 3, 2019

(54) CALIBRATION SYSTEM AND METHOD FOR MULTI-IMAGE OUTPUT SYSTEM

(71) Applicant: ATEN International Co., Ltd., New Taipei (TW)

(72) Inventor: Chun-Chi Liao, Taipei (TW)

(73) Assignee: ATEN International Co., Ltd., New Taipei (TW)

( * ) Notice: Subject to any disclaimer, the term of this patent is extended or adjusted under 35 U.S.C. 154(b) by 0 days.

(21) Appl. No.: 14/958,437

(22) Filed: Dec. 3, 2015

(65) Prior Publication Data

US 2016/0259614 A1 Sep. 8, 2016

(30) Foreign Application Priority Data

Mar. 3, 2015 (TW) .............................. 104106694 A

(51) Int. Cl.
*H04N 5/66* (2006.01)
*H04N 9/12* (2006.01)
*G06F 3/14* (2006.01)
*H04N 9/31* (2006.01)
*G06T 5/50* (2006.01)

(52) U.S. Cl.
CPC .............. *G06F 3/1446* (2013.01); *G06T 5/50* (2013.01); *H04N 9/3147* (2013.01); *H04N 9/3185* (2013.01); *H04N 9/3194* (2013.01); *G09G 2300/023* (2013.01); *G09G 2300/026* (2013.01); *G09G 2320/0693* (2013.01)

(58) Field of Classification Search
CPC ......... G09G 2300/026; G09G 2300/02; H04N 9/3147

USPC ......... 348/383, 745, 806, 38, 778, 840, 180, 348/181, 189; 345/33, 34

See application file for complete search history.

(56) References Cited

U.S. PATENT DOCUMENTS

| | | | |
|---|---|---|---|
| 6,115,092 A | 9/2000 | Greene et al. | |
| 6,181,392 B1 | 1/2001 | Greene et al. | |
| 6,184,952 B1 | 2/2001 | Greene et al. | |
| 6,184,953 B1 | 2/2001 | Greene et al. | |
| 6,188,454 B1 | 2/2001 | Greene et al. | |
| 6,545,685 B1 | 4/2003 | Dorbie | |
| 6,733,138 B2 | 5/2004 | Raskar | |
| 6,753,923 B2 | 6/2004 | Gyoten | |
| 8,866,902 B2 * | 10/2014 | Furui | G03B 21/14 348/135 |
| 8,872,924 B1 | 10/2014 | Lin et al. | |

(Continued)

FOREIGN PATENT DOCUMENTS

CN 1204754 C 6/2005
CN 101312514 A 11/2008

(Continued)

OTHER PUBLICATIONS

Partial European Search Report, dated Jul. 20, 2016, in a counterpart EP application, No. EP 15199793.9.

(Continued)

*Primary Examiner* — Jefferey F Harold
*Assistant Examiner* — Jean W Desir
(74) *Attorney, Agent, or Firm* — Chen Yoshimura LLP

(57) ABSTRACT

The present invention provides a calibration system and method of multi-image output system. The output image of the multi-image output system can be automatically calibrated by using simple hardware apparatus and algorithm.

20 Claims, 11 Drawing Sheets

(56) References Cited

U.S. PATENT DOCUMENTS

| | | | |
|---|---|---|---|
| 10,198,099 B2* | 2/2019 | Sakai | G06F 3/0488 |
| 2003/0052837 A1 | 3/2003 | Raskar | |
| 2005/0117126 A1 | 6/2005 | Miyazawa et al. | |
| 2005/0206857 A1 | 9/2005 | Yamada | |
| 2006/0290890 A1 | 12/2006 | Saito | |
| 2008/0007700 A1 | 1/2008 | vanBaar et al. | |
| 2011/0164137 A1* | 7/2011 | Schwartz | G08B 13/19621 348/159 |
| 2012/0113213 A1* | 5/2012 | Van Arendonk | H04N 5/3415 348/36 |
| 2012/0212627 A1* | 8/2012 | Klose | H04N 9/3182 348/189 |
| 2014/0313103 A1 | 10/2014 | Goel et al. | |

FOREIGN PATENT DOCUMENTS

| | | |
|---|---|---|
| CN | 100589583 C | 2/2010 |
| CN | 201846426 U | 5/2011 |
| CN | 102170544 A | 8/2011 |
| JP | 2007-158398 A | 6/2007 |
| TW | 500942 | 9/2002 |
| TW | 200818114 A | 4/2008 |
| TW | M474156 | 3/2014 |

OTHER PUBLICATIONS

European Search Report and Opinion, dated Dec. 7, 2016, in a counterpart EP application, No. EP 15199793.9.

Lobo et al., "Fusing of image and inertial sensing for camera calibration", International Conference on Multisensor Fusion and Integration for Intelligent Systems, 2001, pp. 103-108.

Taiwanese Office Action, dated Feb. 18, 2016, in a counterpart Taiwanese patent application, No. TW 104106694.

Taiwanese Office Action, dated Apr. 28, 2016, in a counterpart Taiwanese patent application, No. TW 104106694.

Taiwanese Office Action, dated Jun. 28, 2017, in a counterpart Taiwanese patent application, No. TW 104106694.

Taiwanese Office Action, dated Aug. 30, 2017, in a counterpart Taiwanese patent application, No. TW 104106694.

Chinese Office Action, dated Jul. 19, 2017, and Search Report dated Jul. 5, 2017, in a counterpart Chinese patent application, No. CN 201510298579.9.

* cited by examiner

CALIBRATION SYSTEM AND METHOD FOR MULTI-IMAGE OUTPUT SYSTEM

BACKGROUND OF THE INVENTION

Field of the Invention

This invention relates to a calibration system and method for a multi-image output system, and in particular, it relates to a calibration system and method for multiple image output devices that are installed in a spatial arrangement.

Description of Related Art

As projection and display devices become lighter in weight, larger in size, and higher in resolution (e.g. 4K2K resolution), TV walls are becoming more popular, and their installation scheme are more varied (e.g., irregular spatial arrangement, arrangement forming a curved surface, etc.)

However, the increased display device size, the increase number of display devices in the installation and the increased varieties of spatial arrangement schemes mean that it is more complex to set various settings to ensure a seamless combination of the devices.

SUMMARY

Accordingly, an embodiment of the present invention provides a calibration method for calibrating multiple joined images for an image output system, the image output system including a calibration system, a control device, and a plurality of image output devices coupled to the control device forming an image display area, the calibration method including: (S1) the control device dividing a calibration image, which contains position information, into a plurality of calibration image blocks, and outputting them to the plurality of image output devices, so that the image display area displays an output image; (S2) the calibration system capturing the output image; (S3) the calibration system comparing the captured output image and the calibration image to generate adjustment parameters for adjusting the output image; (S4) transmitting the adjustment parameters to the control device; and (S5) the control device adjusting at least one of the plurality of calibration image blocks based on the adjustment parameters, and outputting the at least one adjusted calibration image block to at least one of the plurality of image output devices.

Another embodiment of the present invention provides a calibration method for calibrating multiple joined images for an image output system, the image output system including a calibration system, a control device, and a plurality of image output devices coupled to the control device forming an image display area, the calibration method including: (A1) the control device dividing a calibration image, which contains position information, into a plurality of calibration image blocks, and outputting them to the plurality of image output devices, so that the image display area displays an output image; (A2) the calibration system capturing the output image; (A3) the calibration system comparing the captured output image and the calibration image to generate adjustment parameters for adjusting the output image; (A4) transmitting the adjustment parameters to the control device; (S5) the control device transmitting the adjustment parameters to at least one of the image output devices; and (A6) the at least one image output device that receive the adjustment parameters adjusting the corresponding calibration image block based on the adjustment parameters before outputting the adjusted image block.

Another embodiment of the present invention provides a calibration method for calibrating multiple joined images for an image output system, the image output system including a calibration system, a control device, and a plurality of image output devices coupled to the control device forming an image display area, the calibration method including: (B1) mechanically coupling the plurality of image output devices to a position adjustment system; (B2) the control device dividing a calibration image, which contains position information, into a plurality of calibration image blocks, and outputting them to the plurality of image output devices, so that the image display area displays an output image; (B3) the calibration system capturing the output image; (B4) the calibration system comparing the captured output image and the calibration image to generate adjustment parameters for adjusting the output image; (B5) transmitting the adjustment parameters to the position adjustment system; and (B6) the position adjustment system adjusting physical positioning of at least one of the image output devices based on the adjustment parameters.

Another embodiment of the present invention provides an image output system which includes: a plurality of image output devices forming an image display area; a control device, for dividing a calibration image containing position information into a plurality of calibration image blocks and transmitting the plurality of calibration image blocks to the plurality of image output devices respectively, wherein the image display area displays an output image; and a calibration system, including an image capture module and a processor module, the image capture module capturing the output image, the processor module comparing the captured output image and the calibration image to generate adjustment parameters for adjusting the calibration image.

Compared to conventional technologies, the calibration system and method for multi-image output device according to embodiments of the present invention has the following advantages: (1) Automatic calibration of multi-image output device can be achieved using simple hardware and algorithm. (2) The system and method can be applied in systems using multiple projectors or multiple display screens. (3) The system and method can be applied to systems where the image output devices have any kinds of spatial arrangement, including planar arrangement (where all image output devices can be calibrated at once) and curved arrangement (where some of the image output devices can be calibrated at once).

DETAILED DESCRIPTION OF PREFERRED EMBODIMENTS

Figure 1A:
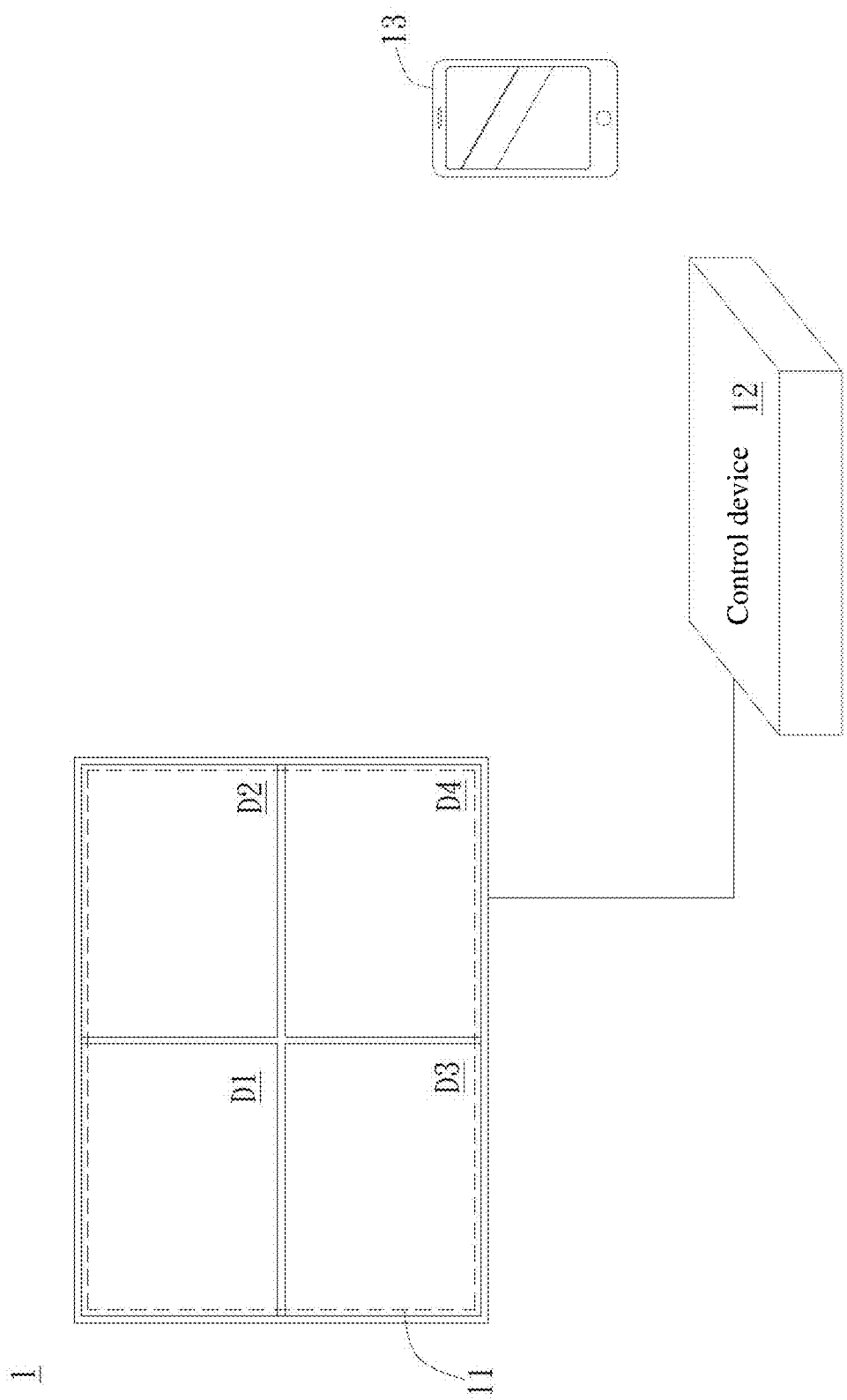
FIG. 1A schematically illustrates a calibration system for multiple image output devices according to an embodiment of the present invention.

Embodiments of the present invention are described below with reference to the drawings. While the embodiments are described in specific details, it should be understood that these specific details do not limit the scope of the present invention. Also, to avoid overcrowding in the drawings, some commonly known structural elements are shown schematically in the drawings.

Figure 1B:
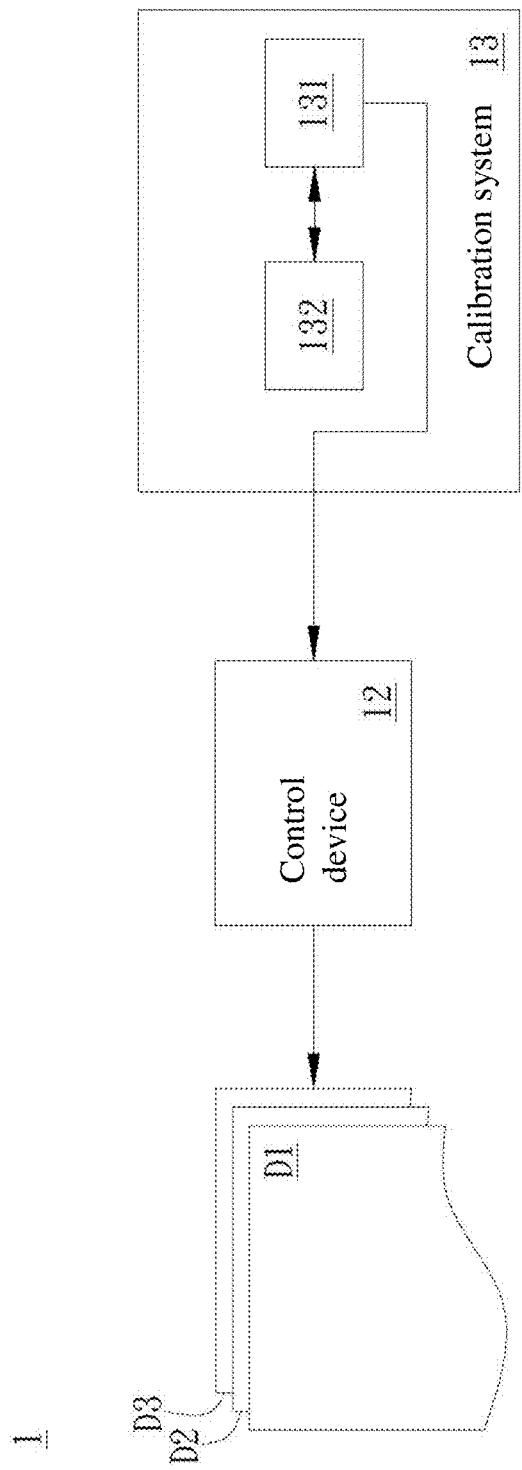
FIG. 1B is a block diagram showing the system of FIG. 1A.

An embodiment of the present invention provides a calibration method for assembling multiple images, which is applicable to an image output system. As shown in FIGS. 1A and 1B, the image output system 1 includes a calibration system 13, a control device 12, and multiple image output devices D1-D4 coupled to the control device 12. The spatially arranged multiple image output devices D1-D4 constitute the display area 11 for displaying an image. The calibration system 13 includes a processor module 131 and an image capture module 132.

It should be noted that in this embodiment, the image output devices D1-D4 are display screens; in other embodiments, they may be projectors. The image display area 11 represents the area of the TV wall formed by the multiple spatially arranged image output devices D1-D4 that can display image; in other embodiments, it can represent the area formed by multiple spatially arranged images projected by multiple projectors. The calibration system 13 may be a smart phone or other mobile computer device, but is not limited to such.

Figure 2:
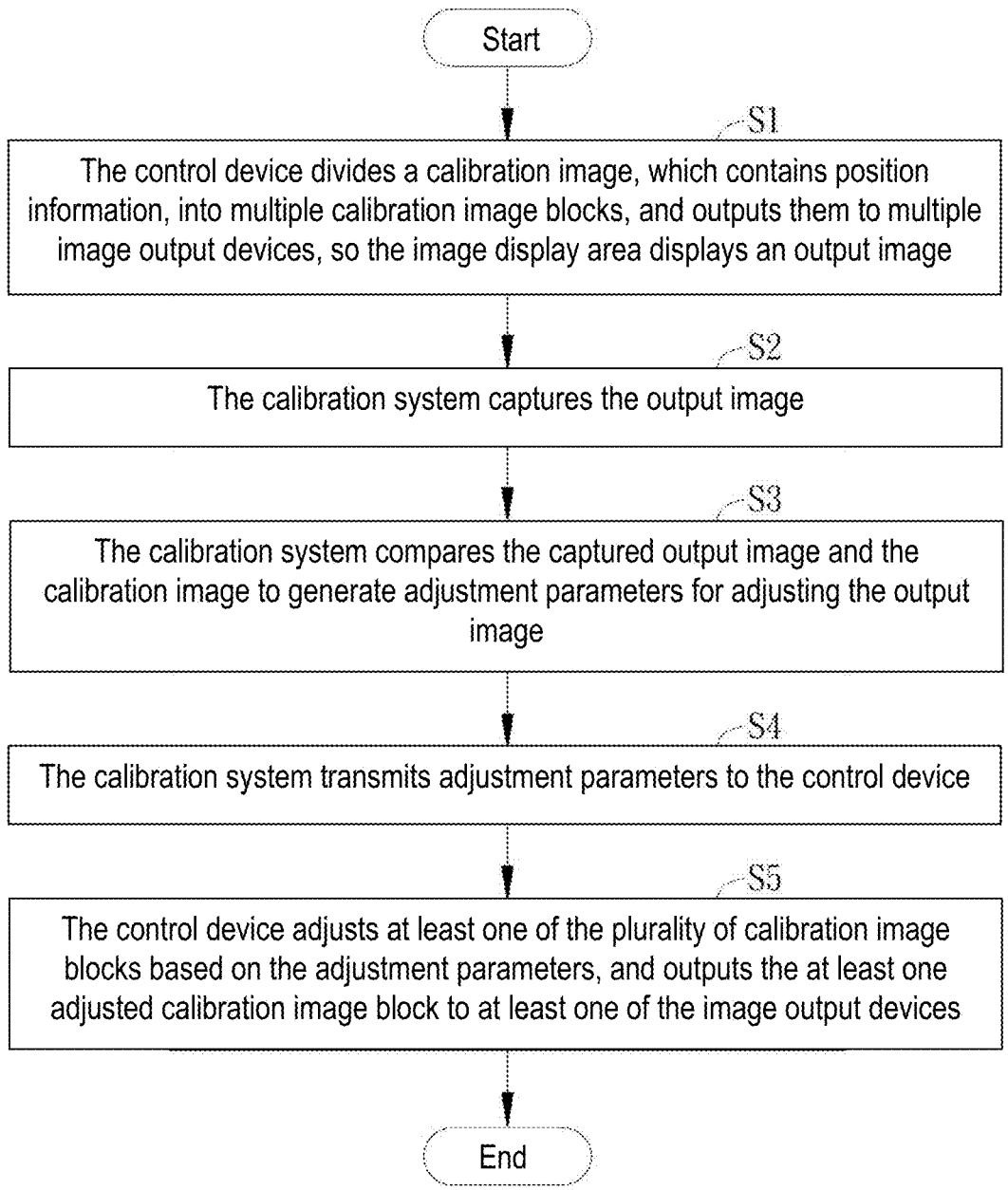
FIG. 2 schematically illustrates a process flow according to an embodiment of the present invention.
Figure 3A:
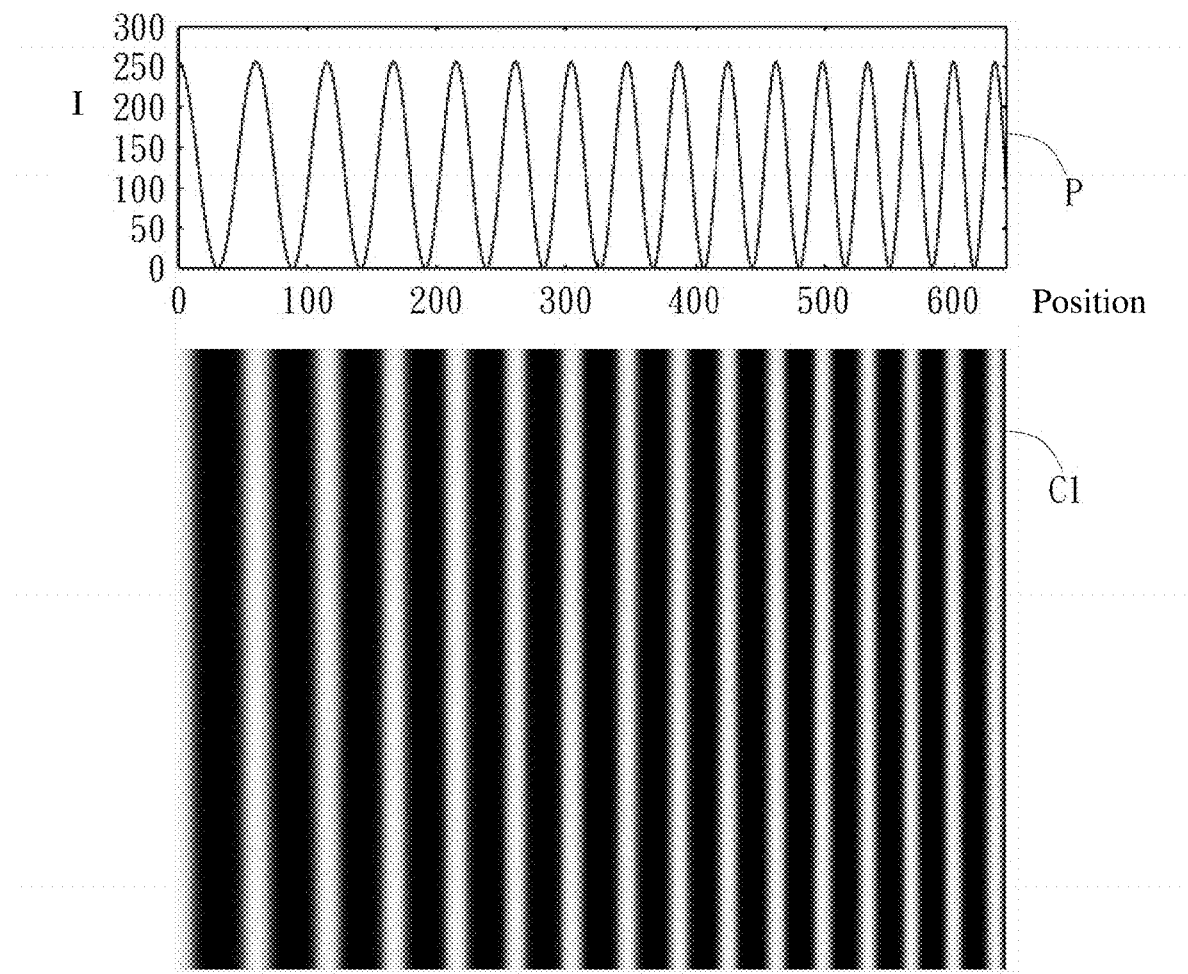
FIGS. 3A and 3B illustrate an embodiment of the present invention.
Figure 3B:
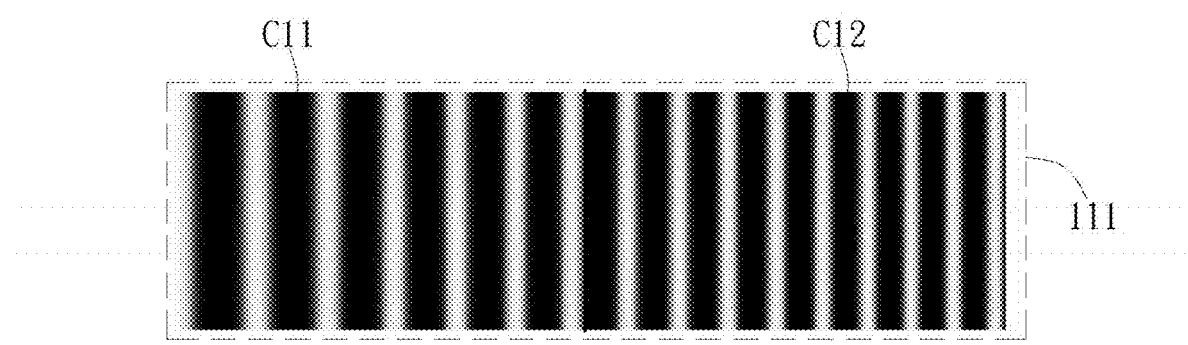
Figure 4:
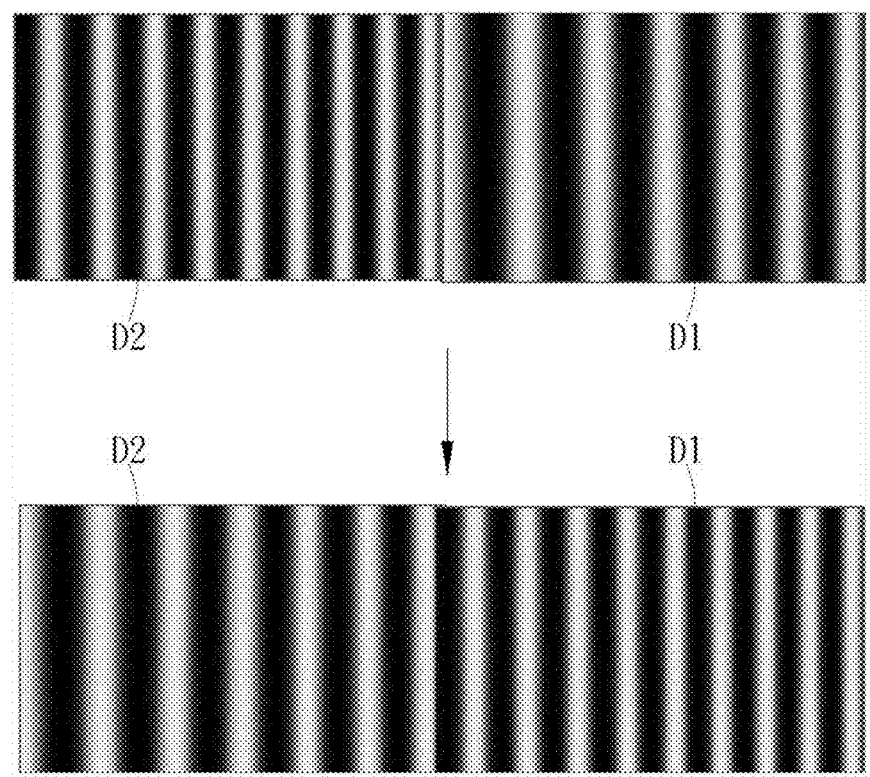
FIG. 4 illustrates another embodiment of the present invention.

Refer to the process shown in FIG. 2, with further reference to FIGS. 3A, 3B and 4. In step S1, using the control device, a calibration image containing position information is divided into multiple calibration image blocks, which are outputted to the multiple image output devices, so that the image display area displays an output image. As shown in FIG. 3A, the control device generates a calibration image C1 which contains position information P. In this embodiment, the calibration image C1 is automatically generated by the control device; in other embodiments, the calibration image may be generated by the calibration system and then transmitted to the control device.

The position information can be constituted by easily recognizable image characteristics. For example, a simple example is a periodic wave formed by color intensity or brightness in the image. As shown in FIG. 3A, it may be an approximate sine wave (where the frequency gradually increases to the right), but it is not limited to such. In other embodiments, the wave may also be a square wave, amplitude modulated signal, etc. In the example shown in FIG. 3B, the calibration image C1 has a characteristic pattern formed by stripes of gradually changing width formed by variations in brightness and color intensity. The widths of the stripes become smaller and smaller toward the right, i.e. the frequency is higher and higher. This calibration image C1 containing the position information P is divided into multiple calibration image blocks C11, C12 and outputted to image output devices D1 and D2 (not shown in the drawings); thus, the image display area 11 displays an output image formed by the calibration image blocks C11 and C12, which has the above-described image characteristics. Because the image characteristics of the calibration image are different in different parts of the image display area, they can be easily recognized.

Figure 3C:
FIG. 3C is another example of the embodiment of FIG. 3A.
Figure 3C:
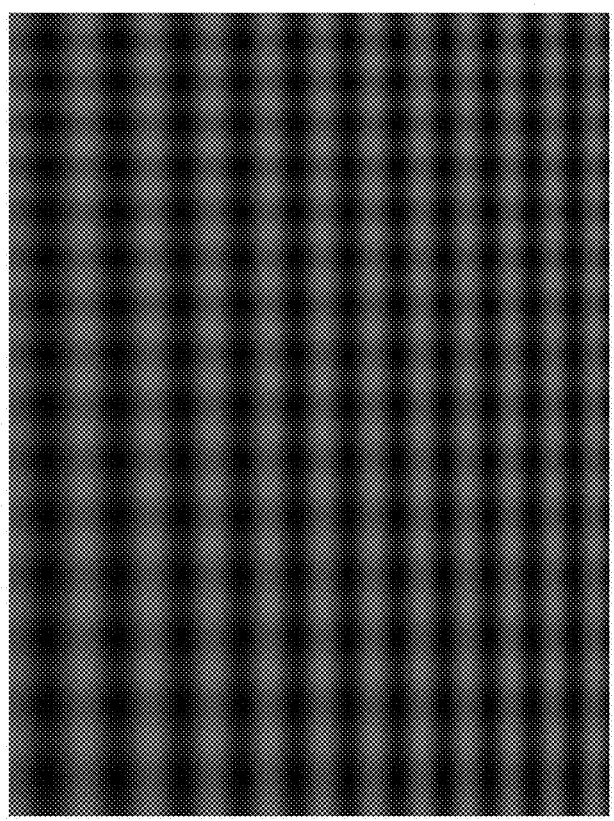

In this embodiment, for ease of description, the image characteristics contain variations in only one direction and are monochromatic. In other embodiments, the image characteristics may be constituted by differences in color, spacing between adjacent stripes, or a combination of the spacing between adjacent stripes and stripe widths, etc. Here, color may include intensity or brightness variation, and the stripes may be a continuous wave or discontinuous wave, but they are not limited to such. For example, as shown in FIG. 3C, the calibration pattern may be formed by interlaced patterns that extend respectively in both the X-axis direction and Y-axis direction, or patterns that extend respectively in the X-axis direction, the Y-axis direction and the 45-degree direction between the X and Y axes. This way, calibration in multiple different directions can be accomplished at the same time, and the calibration accuracy can also be enhanced.

Here, it should be noted that before performing step S2, because the spatial arrangement of the image output devices is not necessarily a regular rectangular arrangement but can be other spatial arrangements, a step may be performed first using the calibration system to establish a base coordinate for the image output devices. For example, a sensor of the calibration system may be used to obtain a first position configuration information for the image display area. In this embodiment, the calibration system can be aligned with a representative plane of the image display area, for example aligned with a plane of a corner of a display screen. At this time, an internal sensor of the calibration system, such as a gravity sensor or an electronic compass, can detect a position information or gravity direction signal. In other embodiments, the sensor may be an acceleration sensor, a position sensor, an altimeter or azimuth sensor; correspondingly, the information obtained is an acceleration signal, position signal, altitude signal or azimuth signal.

In step S2, the calibration system captures the output image in the image display area. For example, the image capture module of the calibration system (such as the front or rear camera of a smart phone) can be used to take a video or photo of the output image in the image display area. Meanwhile, while the calibration system is capturing the output image in the image display area, the calibration system can obtain a second position configuration information of itself, such as another position information or another gravity direction signal.

Step S3 is then performed: The calibration system compares the captured output image with the calibration image, to generate adjustment parameters to be used to adjust the output image. In other words, the calibration system, based on the previously obtained first position configuration information and the second position configuration information, compares the captured output image with the calibration image; more specifically, the calibration system may use simple computations (such as, without limitation, Fourier transform, image correlation) to generate adjustment parameters (such as a compensation value) to be used to adjust the output image. For example, a spatial spectrum distribution of the captured output image may be compared to that of the calibration image to determine the type and amount of adjustment required. A correlation value of the captured output image and the calibration image may be calculated to determine whether any adjustment is required. In step S4, the adjustment parameters are transmitted to the control device. In step S5, the control device adjusts at least one of the calibration image blocks based on the adjustment parameters, and outputs the adjusted image blocks to the corresponding image output devices. For example, as shown in FIG. 4, when the image output devices D1 and D2 have their positions swapped, the output image displayed in the image display area is wrong, because the original calibration image should have increasing pattern frequency toward the right but the actual displayed image does not have such characteristics. Thus, through the image capture and image comparison steps described above, the calibration system generates adjustment parameters and transmits them to the control device. Based on the adjustment parameters, the control device adjusts the calibration image blocks that are outputted to the image output devices D1 and D2 (in this example, swapping the two calibration image blocks that are outputted to the two devices), so that the adjusted calibration image blocks are outputted to the image output devices D1 and D2. Steps S2 to S5 may be repeated to confirm the adjustment that was made. The process of steps S2 to S5 is carried out automatically by the calibration system.

It should be noted that in this embodiment, the control device can communicate with the calibration system via a wireless base station, but it is not limited to such.

Figure 5:
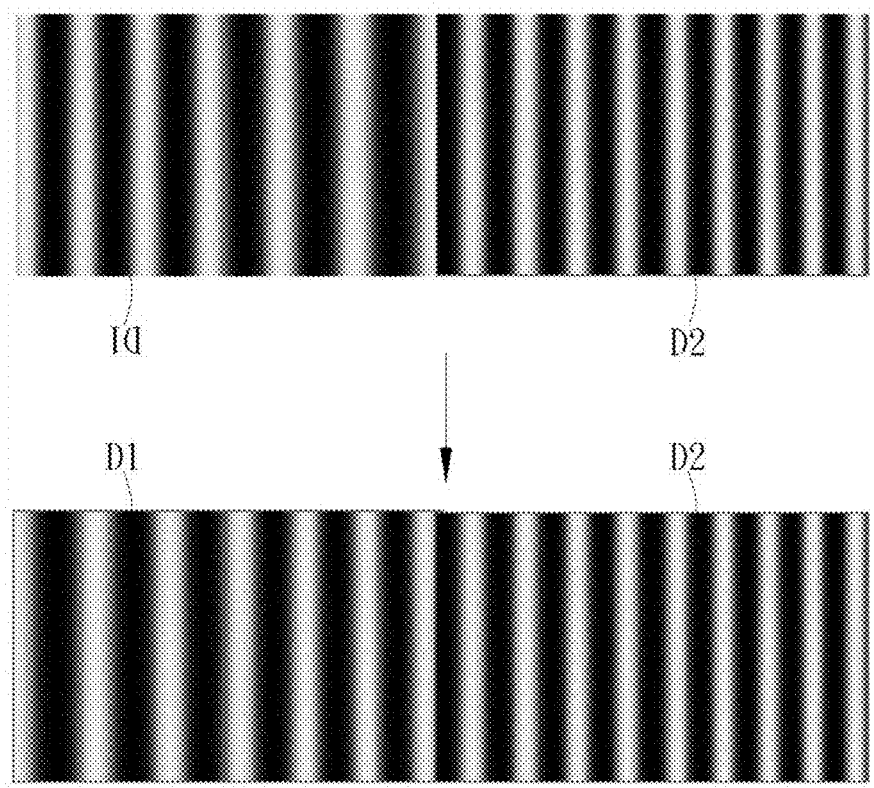
FIG. 5 illustrates another embodiment of the present invention.

In another embodiment, shown in FIG. 5, the image output device D1 is installed upside-down. In this case, the calibration process can adjust the calibration image block to be outputted to the image output device D1 (for example, rotating it by 180 degrees).

Figure 6:
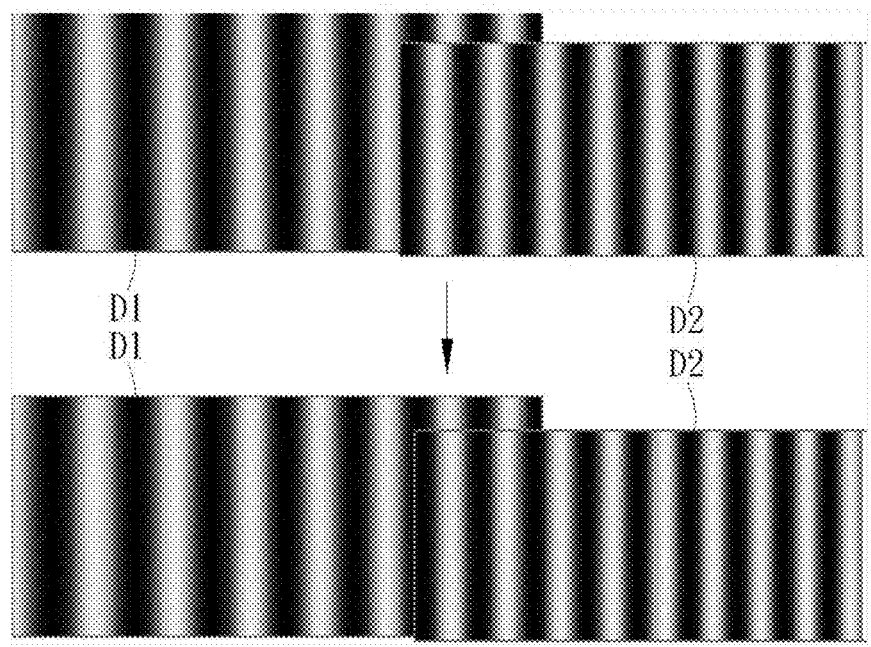
FIG. 6 illustrates another embodiment of the present invention.

In another embodiment, shown in FIG. 6, one of the image output devices is shifted horizontally as installed. In this case, the calibration process can adjust the calibration image block to be outputted to image output device D1 or D2 (for example, by shifting the calibration image block horizontally). In other embodiments, the calibration image blocks can also be rotated, flipped around a lateral axis, enlarged, reduced, corrected for keystone effect (applicable to projectors), shifted vertically, etc.

In some embodiments, the comparison step S3 may use a trial-and-error and/or an iterative process. For example, as illustrated in the examples of FIGS. 4-6, different types of adjustment may be required, such as swapping two image output devices, rotating one of them, etc. A correlation value between the captured output image and the calibration image may be used to determine whether an adjustment is required. The process of step S3 may sequentially perform a number of trial adjustments on the captured output image, for example swapping the left and right halves, rotating a half of it, shifting the left and right halves relative to each other, etc., and re-calculate the correlation between the resulting image and the calibration image to determine whether the trial adjustment is appropriate.

Figure 7:
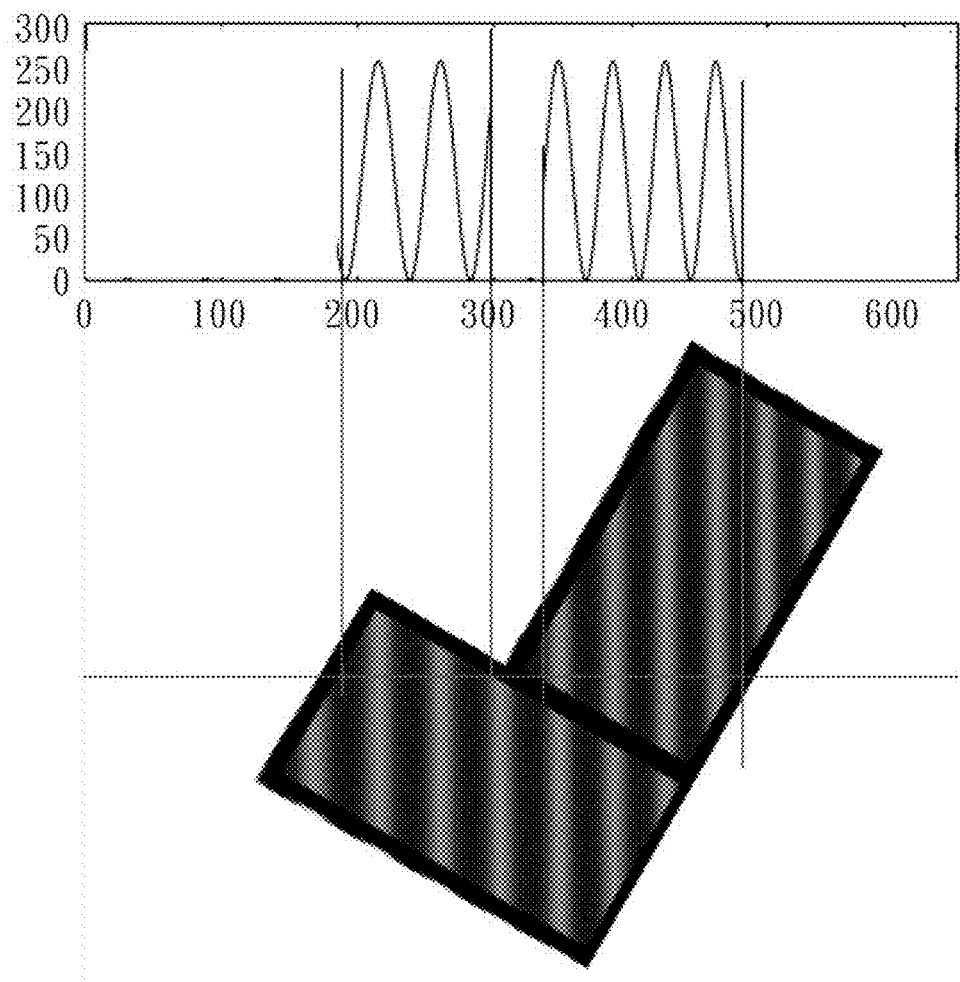
FIG. 7 illustrates another embodiment of the present invention.

As mentioned earlier, the calibration process can also be applied to situations when the image output devices are arranged in an irregular spatial arrangement, such as that shown in FIG. 7. The same calibration process can be applied.

Figure 8:
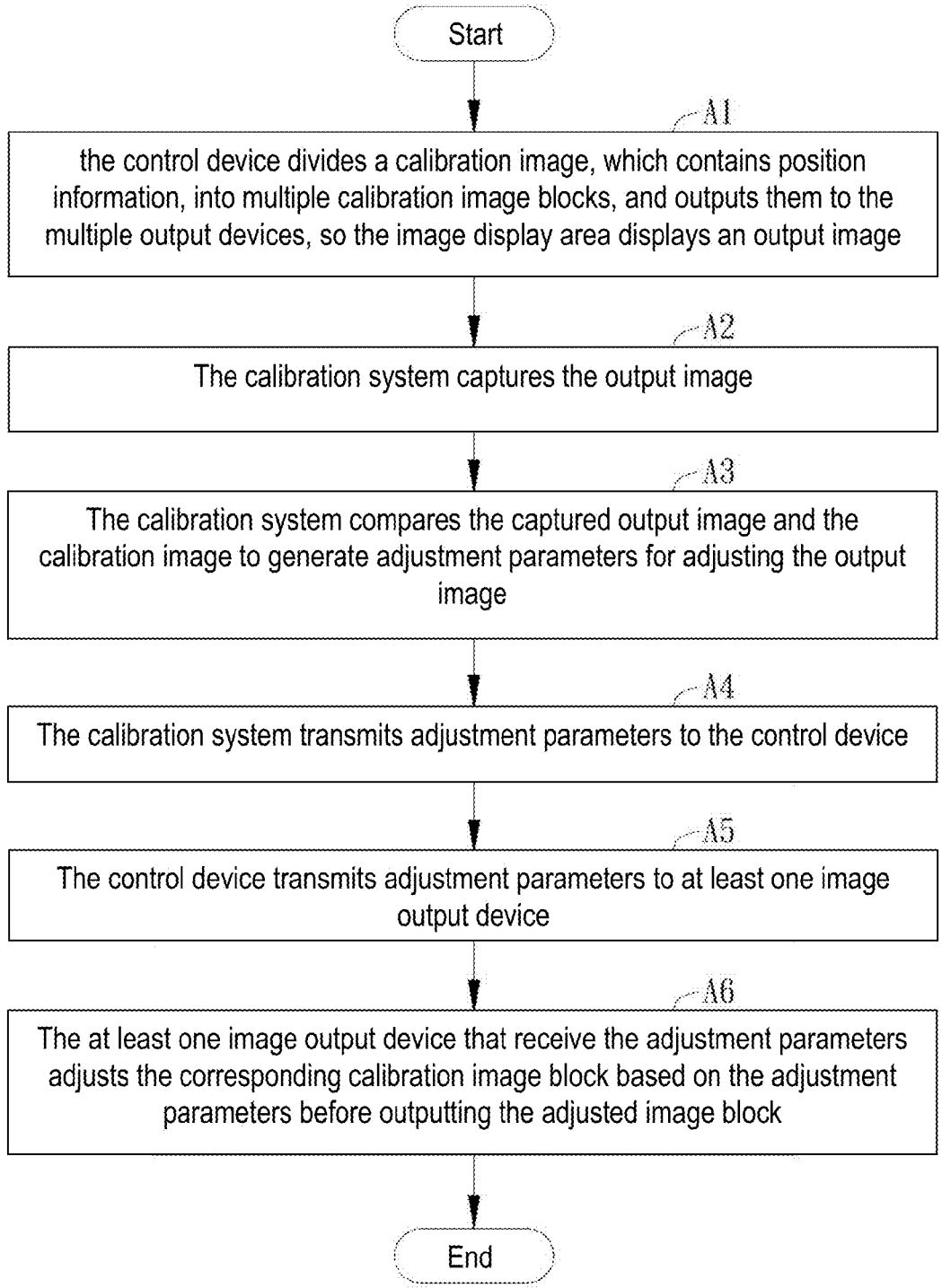
FIG. 8 illustrates a process according to another embodiment of the present invention.

Another embodiment of the present invention is shown in FIG. 8. In step A1, the control device divides a calibration image, which contains position information, into multiple calibration image blocks, and outputs them to the multiple image output devices, so that the image display area displays an output image. In step A2, the calibration system captures the output image. In step A3, the calibration system compares the captured output image and the calibration image, to generate adjustment parameters to be used for adjusting the output image. In step A4, the adjustment parameters are transmitted to the control device. In step A5, the control device transmits the adjustment parameters to at least one of the image output devices. In step A6, the image output device that receives the adjustment parameters adjusts the corresponding calibration image block based on the adjustment parameters before outputting the image block. One difference between this embodiment and the embodiment described earlier is that the control device directly transmits the adjustment parameters to the image output device, and the image output device adjusts the calibration image block based on the adjustment parameters. The other steps of the calibration process are similar to those described earlier with appropriate modifications, and will not be described in detail here.

Figure 9:
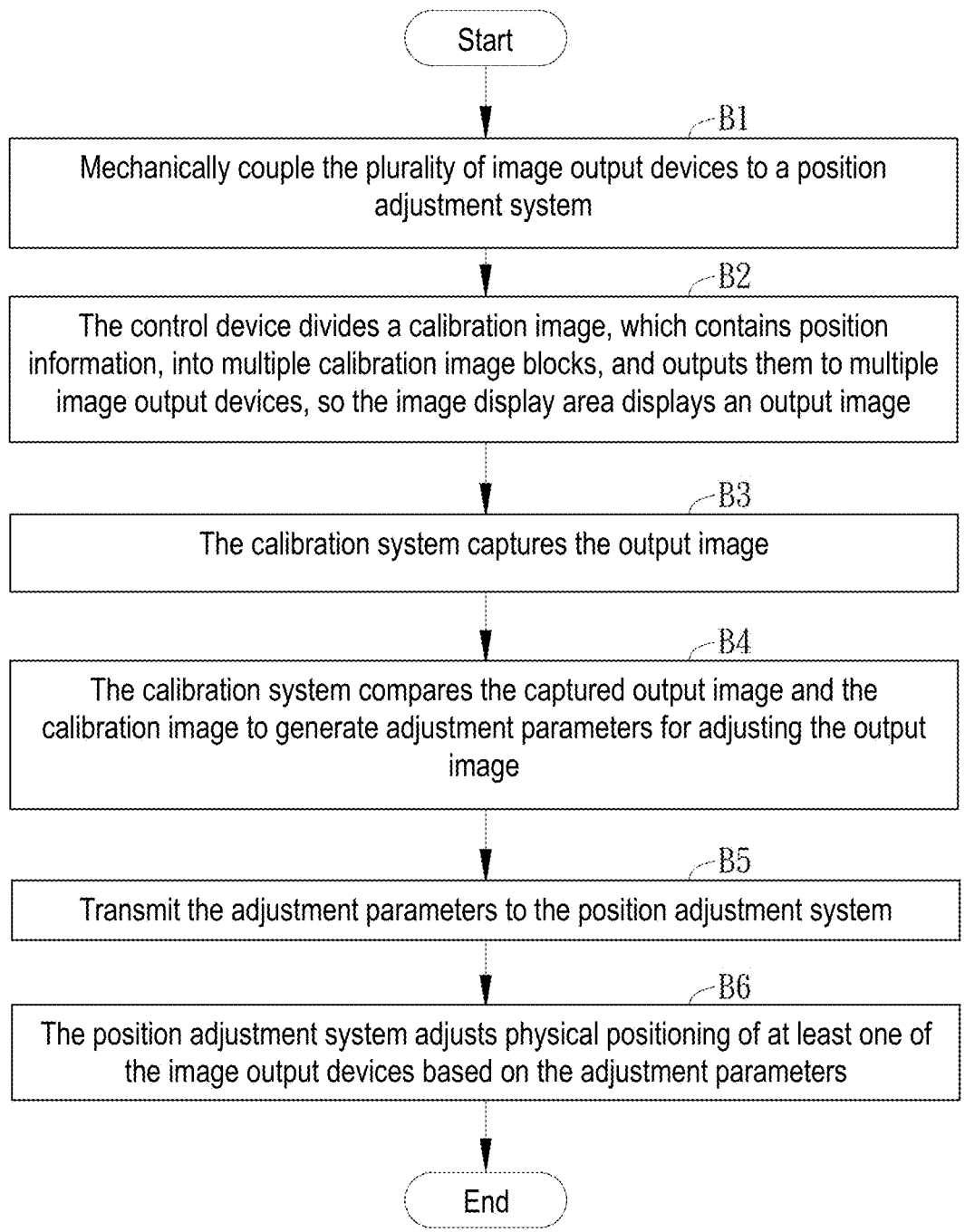
FIG. 9 illustrates a process according to another embodiment of the present invention.

Another embodiment of the present invention is shown in FIG. 9. In step B1, the multiple image output devices are mechanically coupled to a position adjustment system. The position adjustment system (not shown in the drawings) is one that can adjust the physical positioning of the image output devices and can be implemented with any suitable structures. In step B2, the control device divides a calibration image, which contains position information, into multiple calibration image blocks, and outputs them to the multiple image output devices, so that the image display area displays an output image. In step B3, the calibration system captures the output image. In step B4, the calibration system compares the captured output image and the calibration image, to generate adjustment parameters to be used to adjust the output image. In step B5, the adjustment parameters are transmitted to the position adjustment system. In step B6, the position adjustment system adjusts the physical positioning of at least one of the image output devices based on the adjustment parameters. One feature of this embodiment is that the image output devices are mechanically coupled to the position adjustment system; after the calibration system generates the adjustment parameters, the adjustment parameters are transmitted to the position adjustment system, and the position adjustment system adjusts the positioning of the image output devices based on the adjustment parameters, such as swapping positions of the image output devices, shifting or rotating them, etc. The other steps of the calibration process are similar to those described earlier with appropriate modifications, and will not be described in detail here.

Compared to conventional technologies, the calibration system and method for multi-image output device according to embodiments of the present invention has the following advantages: (1) Automatic calibration of multi-image output device can be achieved using simple hardware and algorithm. (2) The system and method can be applied in systems using multiple projectors or multiple display screens. (3) The system and method can be applied to systems where the image output devices have any kinds of spatial arrangement, including planar arrangement (where all image output devices can be calibrated at once) and curved arrangement (where some of the image output devices can be calibrated at once).

Descriptions of the preferred embodiments are given above to illustrate the principle and features of the present invention, and do not limit the scope of the invention. Those skilled in the art will appreciate that various modification and variations can be made without departing from the spirit or scope of the invention. Thus, it is intended that the present invention cover modifications and variations that come within the scope of the appended claims and their equivalents.

What is claimed is:

1. A calibration method for calibrating multiple joined images for an image output system, the image output system including a calibration system, a control device, and a plurality of image output devices coupled to the control device forming an image display area, the calibration method comprising:

the control device generating a plurality of calibration image blocks, the plurality of calibration image blocks jointly constituting a calibration image which contains position information, the control device further outputting the plurality of calibration image blocks respectively to the plurality of image output devices, wherein the calibration image blocks outputted to at least two different ones of the plurality of image output devices are different from each other and are non-identical after any shifting, and wherein the image display area displays an output image;

the calibration system capturing the output image; and the calibration system comparing the captured output image and the calibration image to generate adjustment parameters for adjusting the output image, wherein the adjustment parameters define one or more of: a 180 degree rotation of one of the calibration image blocks, a flipping of the calibration image block around a horizontal or vertical axis, and a swapping of relative positions of two of the calibration image blocks.

2. The calibration method of claim 1, further comprising:
transmitting the adjustment parameters to the control device; and
the control device adjusting at least one of the plurality of calibration image blocks based on the adjustment parameters, and outputting the at least one adjusted calibration image block to at least one of the plurality of image output devices.

3. The calibration method of claim 1, wherein the adjustment parameters further defines an enlargement or reduction of the calibration image block, an adjustment of the image output device corresponding to the calibration image block, a keystone adjustment of the calibration image block, or a horizontal or vertical shift of the calibration image block.

4. The calibration method of claim 1, further comprising:
transmitting the adjustment parameters to the control device;
the control device transmitting the adjustment parameters to at least one of the image output devices; and
the at least one image output device that receive the adjustment parameters adjusting the corresponding calibration image block based on the adjustment parameters before outputting the adjusted image block.

5. The calibration method of claim 1, further comprising:
mechanically coupling the plurality of image output devices to a position adjustment system;
transmitting the adjustment parameters to the position adjustment system; and
the position adjustment system adjusting physical positioning of at least one of the image output devices based on the adjustment parameters.

6. The calibration method of claim 1, further comprising:
using a sensor of the calibration system, obtaining a first position configuration information for the image display area;
while capturing the output image in the image display area, the calibration system obtaining a second position configuration information of the calibration system itself using the sensor; and wherein the calibration system performs the comparing step using the first and the second configuration information.

7. The calibration method of claim 6, wherein the step of obtaining the first position configuration information for the image display area comprises:
aligning the calibration system with a representative plane of the image display area; and
detecting a position information or gravity direction signal using the sensor.

8. The calibration method of claim 6, wherein the sensor is a gravity sensor, an acceleration sensor, a position sensor, an altimeter or an azimuth sensor.

9. The calibration method of claim 1, wherein the calibration image is generated by the calibration system and transmitted to the control device, or generated by the control device.

10. The method of claim 1, wherein the calibration image contains a plurality of stripes, each stripe extending in a first direction across an entirety of the calibration image and being formed by varying color intensity or varying grayscale brightness that vary in a second direction which is non-parallel to the first direction, and wherein the color of the stripes, the grayscale brightness of the stripes, widths of stripes, spacing between adjacent stripes, or a combination of the spacing between adjacent stripes and the stripe widths are different for different stripes located at different positions of the calibration image.

11. The method of claim 10, wherein the color intensity or grayscale brightness of the calibration image varies continuously in a wave pattern along the second direction, and wherein a frequency of the wave pattern gradually increases along the second direction.

12. An image output system comprising:
a plurality of image output devices forming an image display area;
a control device, for generating a plurality of calibration image blocks, the plurality of calibration image blocks jointly constituting a calibration image which contains position information, the control device further transmitting the plurality of calibration image blocks to the plurality of image output devices respectively, wherein the calibration image blocks transmitted to at least two different ones of the plurality of image output devices are different from each other and are non-identical after any shifting, and wherein the image display area displays an output image; and
a calibration system, including an image capture module and a processor module, the image capture module capturing the output image, the processor module comparing the captured output image and the calibration image to generate adjustment parameters for adjusting the calibration image, wherein the adjustment parameters define one or more of: a 180 degree rotation of one of the calibration image blocks, a flipping of the calibration image block around a horizontal or vertical axis, and a swapping of relative positions of two of the calibration image blocks.

13. The system of claim 12, wherein the control device receives the adjustment parameters, and adjusts at least one of the plurality of calibration image blocks, including performing rotation, flipping around a horizontal or vertical axis, enlargement or reduction, horizontal or vertical shifting, or keystone adjustment of the calibration image block, or adjusting an image output device corresponding to the calibration image block.

14. The system of claim 12, wherein the control device receives the adjustment parameters and transmits the adjustment parameters to at least one of the image output devices, and wherein the at least one image output device performs adjustment of the corresponding calibration image block, wherein the adjustment parameters further define enlargement or reduction, horizontal or vertical shifting, or keystone adjustment of the calibration image block.

15. The system of claim 12, further comprising a position adjustment system mechanically coupled to the plurality of image output devices, wherein the position adjustment system adjusts physical positioning of at least one of the image output devices based on the adjustment parameters.

16. The system of claim 12, wherein the calibration system further comprises at least one sensor for obtaining at least one of azimuth signal, position signal, altitude signal or gravity signal of a representative plane of the image display area, or obtaining at least one of azimuth signal, position signal, or altitude signal of the capture module when capturing the output image.

17. The system of claim 16, wherein the sensor is a gravity sensor, an acceleration sensor, a position sensor, an altimeter or an azimuth sensor.

18. The system of claim 12, wherein the calibration image is generated by the calibration system and transmitted to the control device, or generated by the control device.

19. The system of claim 12, wherein the calibration image contains a plurality of stripes, each stripe extending in a first direction across an entirety of the calibration image and being formed by varying color intensity or varying grayscale brightness that vary in a second direction which is non-parallel to the first direction, and wherein the color of the stripes, the grayscale brightness of the stripes, widths of stripes, spacing between adjacent stripes, or a combination of the spacing between adjacent stripes and the stripe widths are different for different stripes located at different positions of the calibration image.

20. The system of claim 19, wherein the color intensity or grayscale brightness of the calibration image varies continuously in a wave pattern along the second direction, and wherein a frequency of the wave pattern gradually increases along the second direction.

* * * * *